July 31, 1962     E. A. BERKERY     3,047,746

SURGE SUPPRESSION FOR POWER SUPPLIES

Filed Dec. 8, 1959

INVENTOR
E. A. BERKERY
BY Roy M. Porter Jr.
ATTORNEY

United States Patent Office 3,047,746
Patented July 31, 1962

1

3,047,746
SURGE SUPPRESSION FOR POWER SUPPLIES
Eugene A. Berkery, Osborneville, N.J., assignor to Bell
Telephone Laboratories, Incorporated, New York,
N.Y., a corporation of New York
Filed Dec. 8, 1959, Ser. No. 858,187
6 Claims. (Cl. 307—93)

This invention relates to surge protecting apparatus and more particularly to apparatus for reducing the amplitude of voltage and current transients that exceed the normal peak voltage or current of the power supplied to the protected equipment.

Lightning discharges and certain types of switching actions can produce transient current or voltage surges of sufficient magnitude to damage unprotected equipment. One form of surge suppressor operates by providing an easy shunt path around the protected equipment. Such a by-pass must have a high impedance under normal conditions, must become conducting substantially instantaneously in the presence of a surge in order to discharge the surge and must return to a high impedance condition after the surge has passed. Spark gaps are typical of this form but they suffer a certain disadvantage in the difficulty with which the spark discharge is extinguished.

A second form of protection is provided by a variable impedance connected in series with the equipment to be protected. The value of the impedance must increase in response to the surge so that the increased voltage appears across the impedance instead of across the protected equipment. Thermistors, varistors and other nonlinear impedance elements are suitable for this use if the power to be handled is not too large. A further disadvantage of this form resides in the fact that even in its low impedance condition, the series protector introduces a substantial power loss. Both the shunt and the series protectors in the forms known to the art suffer from the further disadvantage that they depend upon a predetermined and specified breakdown voltage or current and are therefore unable to adjust to slow changes in peak values of current and voltage.

It is therefore an object of the invention to protect equipment against power surges and current transients that exceed normal operating conditions without interrupting the power on the protected equipment.

In accordance with the invention a diode bridge circuit is employed in combination with either a fixed series impedance or a fixed shunt impedance in an alternating current power supply system. The action of the bridge is such that the impedance is effectively out of the circuit under normal conditions but is in effect switched into the circuit in the presence of a voltage surge or transient current. According to a first embodiment a bridge having an inductor connected across one diagonal thereof is connected in series with the protected equipment. Under steady-state conditions substantially only a rectified direct current flows through the inductance and a minimum impedance is placed in series with the load. A sudden transient current however will encounter a large value of impedance in the inductor and substantially the full voltage produced by the current will appear across the inductance.

In a second embodiment a bridge having a capacitor across its diagonals is connected in shunt with the protected equipment. Under steady-state conditions substantially only a rectified direct current voltage is built up across the capacitor equal to the peak alternating current voltage. A sudden surge voltage however will produce a heavy charging current through the capacitor and will be shunted around the protected equipment.

These and other objects, the nature of the present invention and its various advantages will appear more fully during the course of the following detailed description of the specified embodiments shown in the appended drawings.

Figure 1:
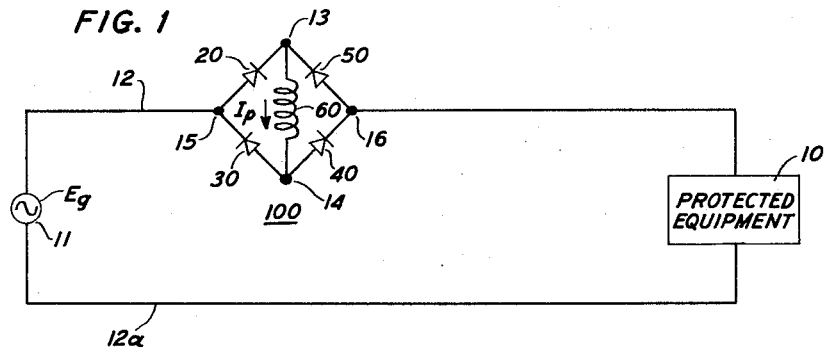
FIG. 1 is a schematic diagram of one embodiment of the invention wherein a low impedance is inserted in series with the protected equipment.

Referring more particularly to FIG. 1 there is shown a source 11 of alternating current voltage $E_g$ for supplying power to equipment 10 to be protected from surges or current transients which may be introduced anywhere along the transmission line 12—12a connecting source 11 to protected equipment 10 or which may result from a sudden variation in source 11. Protection circuit 100 is interposed in series in side 12 of line 12—12a and comprises a bridge circuit of diodes 20, 30, 40 and 50 and inductor 60. The diodes, which may be any type of unilaterally conductive device or rectifying unit capable of continuously carrying the current required to be delivered to equipment 10 are connected in the manner similar to the conventional connection in a full wave bridge rectifier circuit. Specifically one pair of diodes 20 and 50 have like electrodes of one polarity connected together at point 13 and the second pair 30 and 40 have like electrodes of the other polarity connected together at point 14. Junction 15 of oppositely-poled electrodes comprises one alternating current terminal while junction 16 of oppositely-poled electrodes comprises the other alternating current terminal. The alternating current terminals 15 and 16 are serially inserted in line 12. Inductor 60 is connected across the direct current terminals 13 and 14.

Thus, during one-half of the alternating current cycle of source 11, conduction is through diodes 20 and 40 and the inductor 60 in the direction of arrow $I_p$. During the other half of the cycle conduction is through diodes 30 and 50 and the inductor 60 in the same direction. Therefore, after a steady-state condition is reached the current through inductor 60 is predominantly a direct current, having super-imposed thereon a small ripple current. The impedance of inductor 60 for the direct current component is resistive and small; its only significant impedance is that introduced to the small ripple. If the sum of these impedances is small compared to the internal impedances of source 11 and equipment 10, inductor 60 interferes insignificantly with the delivery of power to equipment 10.

If however a sudden surge of current appears that substantially exceeds the peak load current through inductor 60, inductor 60 appears as a very large impedance, a large value of voltage develops across inductor 60 and equipment 10 is protected from excessive voltage. When the steady-state condition is resumed, inductor 60 again presents only a small impedance. Note that the suppression level is self-regulating. If the steady-state current should gradually increase, the direct current through inductor 60 will also increase and only transients that exceed this new value will be suppressed.

Figure 2:
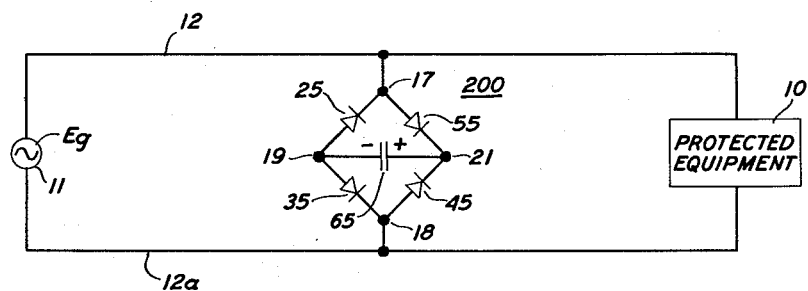
FIG. 2 is a schematic diagram of another embodiment of the invention wherein a high impedance is inserted in shunt with the protected equipment.

Referring to FIG. 2 an embodiment of the invention is shown based upon the shunt principle of surge protection. Thus, protection circuit 200 comprises a bridge of rectifying elements or diodes 25, 35, 45, and 55 connected in the manner of the bridge described in FIG. 1. The alternating current terminals 17 and 18 comprising the junctions of dissimilar diode poles, are connected between lines 12 and 12a and in shunt with equipment 10. A capacitor 65 of large value is connected across the direct current terminals 19 and 21 comprising the junctions of like diode poles.

In operation an initial charging current for capacitor 65 flows during one-half of the alternating current cycle through diodes 25 and 45 and during the other half cycle through diodes 55 and 35 to charge capacitor 65 in a given polarity to the peak voltage of source 11. After capacitor 65 is charged no further current is drawn. However, any sudden increase in voltage between lines 12 and 12a will cause capacitor 65 to draw a heavy charging current and shunt any increase in current around equipment 10.

Figure 3:
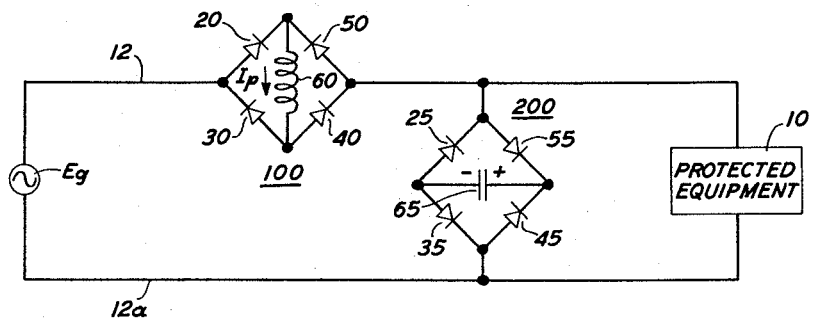
FIG. 3 is a schematic diagram of a combination of the protective schemes of FIGS. 1 and 2.

The embodiment of FIG. 3 involves both the series bridge protector 100 of FIG. 1 and the shunt bridge protector 200 of FIG. 2. Protector 100 is located on the source side of protector 200 and protector 200 is located on the load side of protector 100. The advantage of this combination resides in its combined action in the presence of a voltage transient. Thus, if the voltage between lines 12 and 12a suddenly exceeds the steady-state peak voltage, capacitor 65 will draw a heavy charging current. When this current exceeds the peak line current, inductor 60 will effectively be connected in series to reduce the surge current of the capacitor.

In the preceding embodiments steady-state values of current and voltage provide the reference levels for suppressing surges above these values. It should be apparent however that the reference levels could be permanently set by a low voltage, constant current source in series with inductor 60 and/or by a high voltage, low current supply connected across capacitor 65.

In all cases it is understood that the above-described embodiments are merely illustrative of a small number of many possible specific embodiments which can represent applications of the principles of the invention. Numerous and varied other arrangements can readily be devised in accordance with these principles by those skilled in the art without departing from the spirit and scope of the invention.

What is claimed is:

1. A source of an input wave of regular predetermined shape susceptible to random instantaneous increases in maximum amplitude, a load connected to said source, circuit means continuously connected in series with said load and said input which after the period of time required to reach steady-state conditions presents a relatively small impedance to said input wave if no random instantaneous increase in the maximum amplitude of said input wave form occurs, said circuit means adapted to present a relatively large impedance to said input wave during the portions of time that any random instantaneous increase in the maximum amplitude of said input wave occurs, said circuit means comprising a bridge circuit having a diode in each branch, one pair of diametrically opposed terminals of said bridge circuit being connected in series with said load and said input and the other pair of diametrically opposed terminals of said bridge circuit having an inductor connected thereacross.

2. A circuit for suppressing voltage surges comprising an alternating current source susceptible to random instantaneous increases in its maximum amplitude, a load for said source, a first bridge circuit having a diode in each branch, one pair of diametrically opposed terminals of said first bridge circuit connected in series with said alternating current source and said load, the other pair of diametrically opposed terminals of said first bridge circuit having an inductor connected thereacross, and a second bridge circuit having a diode connected in each branch, one pair of diametrically opposed terminals of said second bridge circuit connected in parallel with said load, the other pair of diametrically opposed terminals of said second bridge circuit having a capacitor connected thereacross.

3. A source of alternating current power, a load to receive and utilize said power connected to said source by a power transmission line comprising a pair of conductors, a protective circuit connected in one transmission line in series with said load, said protective circuit comprising four unilateral conducting devices connected as a bridge, an inductor connected across one diagonal of said bridge and the other diagonal of said bridge being connected between said source and said load.

4. The combination according to claim 3 wherein one pair of said unilateral conducting devices are connected with like electrodes of one polarity joined together and wherein the other pair of said devices are connected with like electrodes of the other polarity joined together and wherein said inductor is connected across the junction between said one pair and the junction between said other pair.

5. A source of alternating current power, a load to receive and utilize said power connected to said source by a power transmission line comprising a pair of conductors, a protective circuit comprising four unilateral conducting devices connected as a bridge, a capacitor connected across one diagonal of said bridge and the other diagonal of said bridge being connected between the conductors of said transmission line in shunt with said load.

6. The combination according to claim 5 wherein one pair of said unilateral conducting devices are connected with like electrodes of one polarity joined together and wherein the other pair of said devices are connected with like electrodes of the other polarity joined together and wherein said capacitor is connected across the junction between said one pair and the junction between said other pair.

References Cited in the file of this patent

UNITED STATES PATENTS

| 2,248,793 | Terry | July 8, 1941 |
| 2,323,650 | Dawson | July 6, 1953 |